Jan. 8, 1963  L. A. CARRIOL  3,072,291
INDICATING MEANS FOR LIQUID DISPENSER
Filed Feb. 10, 1959  2 Sheets-Sheet 1
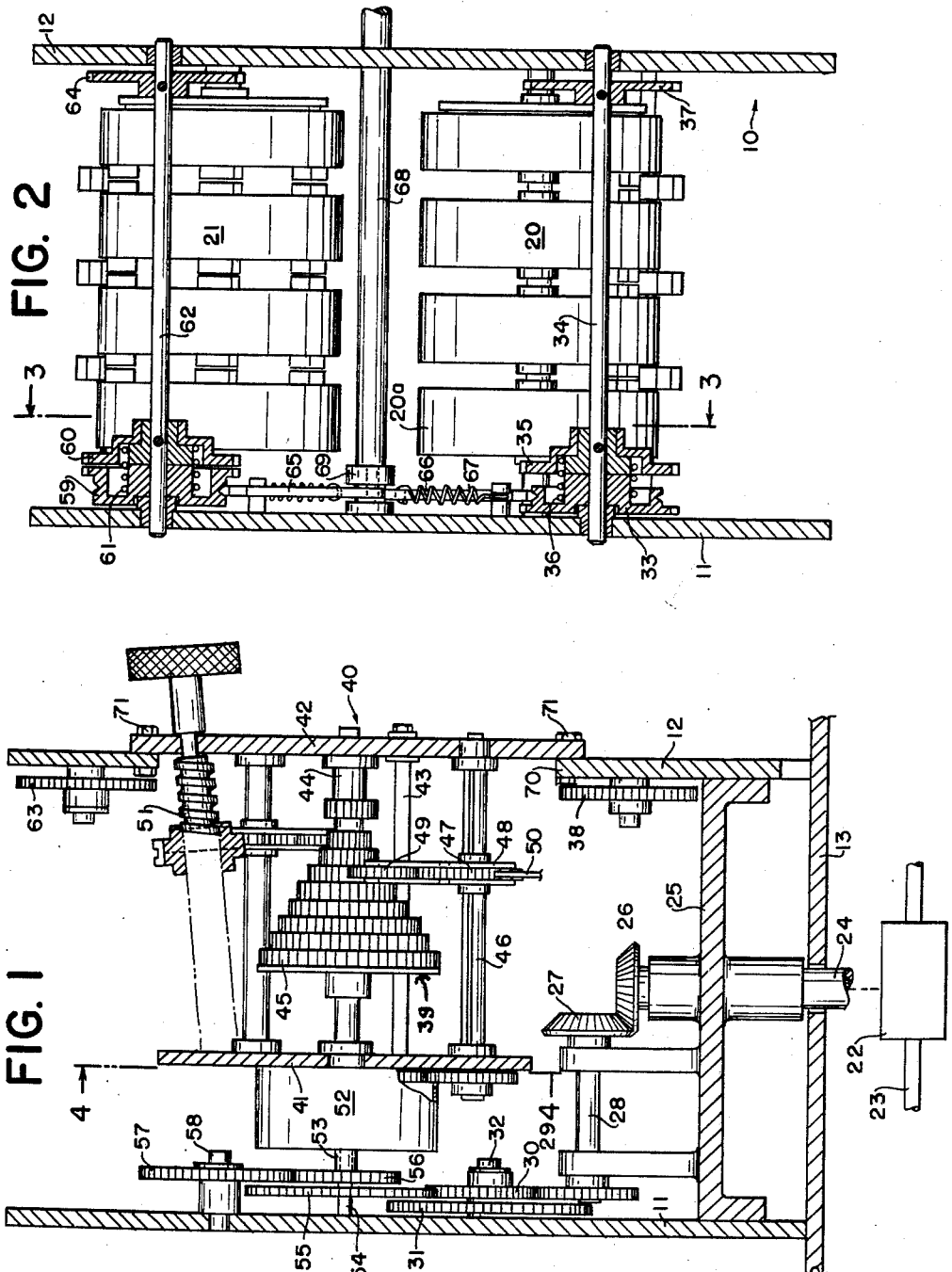
INVENTOR
LOUIS A. CARRIOL
ATTORNEYS Jan. 8, 1963  L. A. CARRIOL  3,072,291
INDICATING MEANS FOR LIQUID DISPENSER
Filed Feb. 10, 1959  2 Sheets-Sheet 2

INVENTOR
LOUIS A. CARRIOL
BY
ATTORNEYS

United States Patent Office 3,072,291
Patented Jan. 8, 1963

3,072,291
INDICATING MEANS FOR LIQUID DISPENSER
Louis A. Carriol, Aulnay-sous-Bois, France, assignor to Societe d'Etudes d'Inventions, et de Brevets-S.E.I.B., Paris, France
Filed Feb. 10, 1959, Ser. No. 792,316
Claims priority, application France Feb. 10, 1958
3 Claims. (Cl. 222—26)

The present invention relates to liquid dispensing apparatus, and more particularly to a novel and improved indicating mechanism for incorporation in fuel dispensing installations, for example.

Certain fuel dispensing pump installations of known design incorporate indicators, visible from both sides of a housing for the installation, for indicating the quantity of fuel dispensed, as well as the price thereof. Conventionally, such indicator means includes four sets of indicator drums, two on each side of the housing. The two sets of drums on each side of the housing constitute a pair and one set of the pair indicates volume while the other indicates price. The other pair of indicator drums registers the identical information on the opposite side of the housing, so that the results of a delivery operation may be observed from either side.

Conventionally, the volume register drums are driven by a fuel metering device interposed in the delivery line, while the price registering drums are driven from the metering device, through a variable transmission by means of which the unit price of the fuel may be varied. Heretofore, in certain dispensing installations of known design, it has been necessary to mount both the metering device and the variable transmission below the sets of drums, in the housing, in order to avoid utilizing an excessively thick housing or otherwise proportioning or configuring the housing and/or its components in an undesirable manner.

In accordance with the present invention, there is provided a novel and improved mechanism for indicating, on both sides of the housing of a fuel delivery installation, both the volume and the price of the dispensed fuel, and which may be incorporated in a minimum cubic space in relation to the size and arrangement of the component parts. To this end, the mechanism of the invention includes, in the generally rectangular area defined by the axes of the four sets of indicator drums, a variable transmission mechanism comprising a conical stack of gears disposed on an axis positioned generally centrally with respect to the four drum axes and disposed parallel thereto. A plurality of output shafts for the transmission mechanism are also disposed parallel to the drum shafts and are positioned in open areas afforded between the drums and the conical gear stack. The improved arrangement effects a substantial reduction in the space required to house the necessary components of the overall mechanism without requiring miniaturization of the components.

One of the more specific features of the invention resides in the provision, in an improved mechanism of the type and having the characteristics specified in the foregoing paragraph, of an improved variable transmission assembly and related mechanism, so arranged that the transmission assembly may be removed bodily from an end wall of the housing. The improved apparatus includes a transmission mechanism, mounted on a frame, which is received longitudinally in the open area defined by the sets of drums and which is removably secured to the housing in a convenient manner. Other components of the complete mechanism are so arranged that the insertion and removal of the transmission assembly may be accomplished without difficulty.

For a better understanding of the invention and for a further discussion of the above and other advantageous features thereof, reference should be made to the following detailed description and to the accompanying drawings, in which:

FIGS. 1 and 2 are longitudinal, cross-sectional views of the new mechanism, taken generally on lines 1—1, 2—2, respectively, of FIG. 3;

Figure 3:
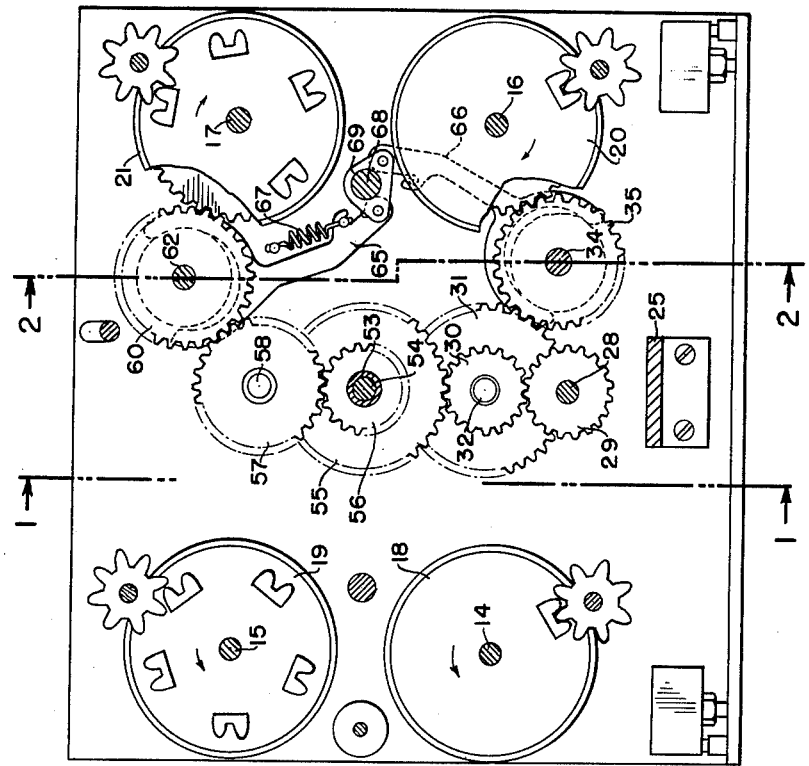
FIG. 3 is a cross-sectional view of the new apparatus taken generally on line 3—3 of FIG. 2.

Referring now to the drawings, the reference numeral 10 designates, generally, a housing for a fuel dispensing installation. The housing may be of generally rectangular outline and has spaced end walls 11, 12 and a bottom wall 13. As shown in FIG. 3, the housing walls 11, 12 support a plurality of shafts 14—17, on which are mounted sets of indicator drums 18—21. The sets of indicator drums may, of themselves, be conventional transfer indicators, in which the drum of the lowest order is driven by external means, while the higher order drums are driven by transfer means, such as Geneva-type mechanisms, for example, acting between adjacent drums of a set. Two sets 18, 19 of drums are mounted adjacent the front of the housing, while the other two sets of drums are mounted adjacent the back of the housing. The arrangement is such that limited portions of the drums are visible from the front or back of the installation.

Conventionally, the sets of drums are arranged to indicate the volume and price of delivered fuel, with corresponding drums on opposite sides of the housing providing identical readings. Thus, in the illustrated mechanism, the lower drum sets 18, 20 are driven in unison, to indicate the volume of fuel delivered, and the upper drum sets 19, 21 are driven in unison to indicate the price of the fuel. The price indicating drums must, of course, have a variable driving relationship to the volume indicating drums, to accommodate such variations in the unit price of the fuel as may occur from time to time.

In accordance with conventional design, the sets of drums are arranged with their shafts 14—17 in parallel relation and outlining a generally rectangular area, substantially as shown in FIG. 3. Driving means for the drums, which conventionally include a liquid meter, operate to drive the lower, volume indicating drums 18, 20, and a variable transmission for driving the upper, price indicating drums 19, 21. Heretofore, in apparatus of the particular type contemplated herein, the liquid meter and transmission have been mounted below the sets of drums, as it was considered impracticable to mount either the meter or the transmission in the general area surrounded by the drums, without reducing the size of the drums or of other components or increasing the size of the housing, both of which expedients are undesirable for various reasons.

In the apparatus of the invention, only the fluid meter is mounted below the drums and, by a novel and improved arrangement of parts, the variable transmission means is placed substantially within the generally rectangular area defined by the drum shafts 14—17. Thus, a suitable meter 22, which may be conventional, is mounted in the main housing of a dispensing installation, below the bottom wall 13 of the mechanism housing 10. The meter is connected into the fuel delivery line 23 and is arranged to drive an input shaft 24, journalled for rotation about a vertical axis by a supporting bracket 25.

A bevel gear 26 is fixed to the top of the input shaft 24 and meshes with a mating gear 27 fixed to the end of a shaft 28 journalled by the bracket 25 for rotation about an axis parallel to the drum shafts. The shaft 28, as indicated in FIG. 3, is disposed substantially centrally between the front and back of the housing, at a level below the lower drum shafts 14, 16 and about even with the lower edges of the drums 18, 20. The shaft 28 extends laterally to a point adjacent the housing side wall 11 and has mounted thereon, adjacent the wall, a pinion 29. The pinion 29 meshes with a gear 30, which is fixed to a gear 31 of larger diameter, the gears 30—31 being mounted directly above the shaft 28, on a stub shaft 32 extending from the housing wall 11.

As shown in FIGS. 2 and 3, the gear 31 meshes with and drives a gear 33, which is supported for free rotation on a shaft 34 journalled by and extending between the housing walls 11, 12. A second gear 35 is fixed to the shaft 34 and connected to the gear 33 by a spring clutch 36. The gears 33, 35 and clutch 36 constitute a zero-resetting mechanism, as described more particularly in French Patent No. 1,168,905 filed July 26, 1956, in the name of the assignee of this application. Thus, when the gear 33 is driven in one direction, the gear 35 and shaft 34 are driven through the spring clutch, while rotation of the gear 35 in said one direction will effect rotation of the shaft 34 independently of the gear 33. The auxiliary means for rotating the gear 35, to reset the sets of drums to zero positions, forms no part of the present invention and, therefore, is not illustrated or described herein.

The units drum 20a of the volume indicator drum is arranged to be driven, through a train of intermediate gears (not shown) driven by the gear 35 or by a gear 37 fixed to the shaft 34 adjacent the housing wall 12. Advantageously, the intermediate gears are mounted on or adjacent the housing end walls, beyond the ends of the drum assemblies. Likewise, the units drum (not specifically shown) of the other set 18 of volume indicator drums, is driven by an intermediate gear train, including the gear 38, supported by the wall 12 and driven by the gear 37. The arrangement is such that both sets of volume indicator drums are driven in unison, through the zero-resetting clutch means formed by the gears 33, 35 and the spring 36.

Figure 5:
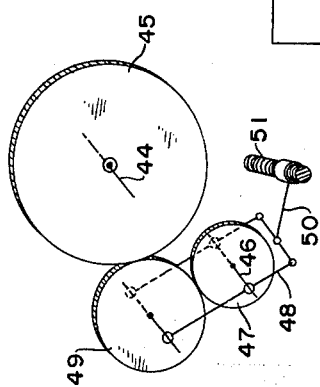
FIG. 5 is a simplified, schematic representation of part of the adjusting means incorporated in the new mechanism.

For driving the price indicator drums 19, 21, there is provided a variable transmission means 39 which, per se, may be conventional but which is incorporated in a novel way with the indicating drum mechanisms whereby to achieve a highly compact overall assembly without undesirably changing the proportions of the components. Thus, received within the space provided between the sets of indicator drums is a frame 40, comprising a pair of spaced end plates 41, 42 held in fixed relation by means such as posts 43. Mounted for rotation by the frame plates 41, 42 is a shaft 44, which is disposed generally centrally with respect to the drum shafts 14—17 and parallel thereto, and which has fixed thereon a conical stack of gears 45 proportional in diameter to the integers 1–9. The frame 40 also journals a plurality of output shafts 46, which are disposed parallel to the drum shafts 14—17 and are spaced about the main shaft 44 of the transmission assembly. The shafts 46 are keyed to slidably mounted gears 47 (FIG. 5) held by yokes 48 in mesh with idler gears 49. The idler gears 49 are arranged to be pivoted, by the yokes 48 into mesh with selected gears 45 of the conical stack, actuation of the yokes being effected through links 50, by means of threaded shafts 51 mounted in the frame plates 44, 42 for eccentric rotation and disposed at an angle with respect to the output shafts 46. Thus, by manipulation of the threaded shafts, the idler gears 49 can be engaged individually and selectively with selected gears of the stack.

In the illustrated apparatus, three output shafts 46 are provided, disposed uniformly about the conical stack of gears 45. A more complete description of such a transmission mechanism is contained in French patent application No. 756,351, filed January 21, 1958, and in French Patent No. 842,413. A modified and improved form of the transmission means, utilizing four output shafts, is described and claimed in United States patent application Ser. No. 782,213, filed December 22, 1958, now Patent No. 2,986,951.

At the end of the transmission frame 40 is an integrating mechanism 52, which may be of the general type described in French Patent No. 842,413 and which includes means for adding the rotations of the several output shafts 46 and rotating a shaft 53 in accordance therewith. The shaft 53 may be hollow, to receive an input shaft 54, which is connected directly to the main shaft 44 of the transmission assembly and mounts, at its outer end, a gear 55, which meshes with the gear 30 and is driven thereby in accordance with the operations of the fuel meter 22.

Thus, the input to the transmission means is provided through the shaft 54, while the output therefrom is provided by the shaft 53, which has fixed thereto a gear 56. The gear 56 drives a gear 57 which, is mounted by a stub shaft 58 on the housing wall 11 and, in general, corresponds in function to the gear 31, from which the volume indicator drums 18, 20 are driven. The gear 57 drives a gear 59 (FIG. 2) forming, with a gear 60 and spring 61, a zero-resetting clutch for driving a shaft 62. The shaft 62, like the shaft 34, extends between and is journalled by the housing walls 11, 12, the shaft 62 being disposed adjacent the price indicator drums 21 and in parallel relation to the drum shafts 14—17. The units drums of the respective drum sets 19, 21 are driven from the shaft 62, by gear trains mounted on one or both of the housing walls 11, 12 and, in the illustrated apparatus, a gear 63 forms part of the gear train for driving the units drum of the set 19, the gear 63 being driven in turn from gear 64 fixed to the shaft 62 adjacent the wall 12.

In conjunction with the zero-resetting means of the illustrated apparatus, there are provided brake means in the form of forked brake elements 65, 66 which embrace the gears 33, 59 and are urged into frictional contact therewith by springs 67. A shaft 68 supported by the housing walls has fixed thereto a lever 69, to which the brake elements 65, 66 are connected and, when the shaft 68 is rotated in one direction or the other, braking force will be applied to or released from the gears 33, 59.

Figure 4:
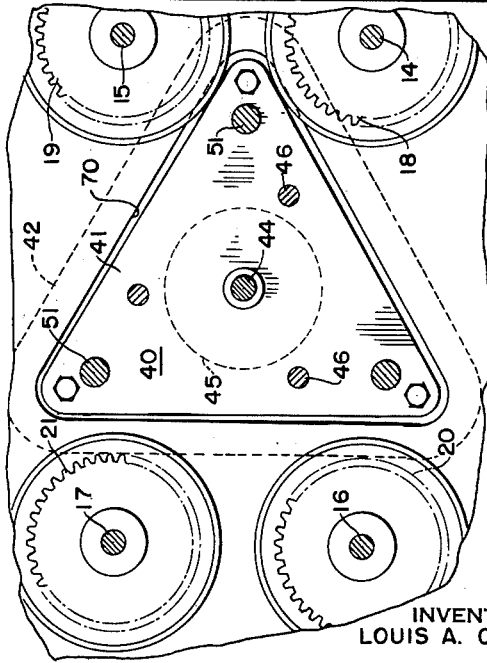
FIG. 4 is a cross-sectional view of the new apparatus taken generally on line 4—4 of FIG. 1.

As shown in FIG. 4, the inner plate 41 of the transmission frame 40 is of a configuration to be received in the area between the sets of indicator drums. In this respect, the illustrated apparatus includes a transmission with three output shafts, in which case one of the assemblies, including an output shaft 46 and threaded shaft 51, advantageously is disposed in the recessed area between the volume and price indicator drums at one side of the housing. Where a transmission unit having four output shafts is used, the shaft assemblies may be arranged so that an opposed pair thereof is received in the recesses defined by the drums at both sides of the housing.

By thus orienting the transmission assembly and the parts thereof, the assembly may be housed in the space normally provided between the sets of drums, without reducing the size of the drums or other components. And, in accordance with one aspect of the invention, the transmission assembly is removable, as a unit, from the housing, at one end thereof. Thus, as shown in FIG. 1, the housing wall 12 is provided with an opening 70 of a size and shape suitable to accommodate insertion and removal of the frame 40 and the components supported thereby. The outer plate 42 of the frame 40 is, however, of greater size than the opening 70, so that the plate 42 overlaps marginal areas of the housing wall 12 surrounding the opening. The plate 42 is secured to the wall 12, as by bolts 71 and, advantageously, the plate 42 constitutes substantially the sole means of supporting the transmission assembly in the housing.

The new mechanism makes possible a substantial reduction in the size of a fuel dispensing installation, without, however, necessitating a reduction in the size of the components heretofore used, or requiring an increase in the size of the housing. This advantageous result is achieved by disposing a variable transmission assembly including a conical stack of gears and a plurality of output shafts in parallel relation to the indicator drum shafts and within the generally rectangular area defined by the drum shafts. The various components of the drive system, apart from the transmission assembly, are arranged adjacent the side walls of the housing, insofar as practicable, and outside the area of the transmission assembly, permitting insertion and removal of the assembly through an opening in the housing wall, while the associated mechanism remains intact.

It should be understood, however, that the specific form of the invention herein illustrated is intended to be representative only, as certain changes may be made therein without departing from the clear teachings of the disclosure. Accordingly, reference should be made to the following appended claims in determining the full scope of the invention.

I claim:

1. Liquid dispensing apparatus comprising a housing, four sets of indicator drums disposed on parallel horizontal axes, said sets including two pairs of two sets each, the sets of each pair being disposed one above the other and the two pairs being disposed at opposite sides of said housing, the axes of said sets defining a space of substantially rectangular parallelepiped shape, liquid metering means exterior of said space, a first gear journaled in said housing and driven from said metering means, means coupling said gear to one set of drums of each of said pairs, a second gear journaled in said housing, means coupling said second gear to the other set of drums of each of said pairs, and variable drive means for interconnection of said first and second gears disposed substantially entirely within said space, said variable drive means comprising an input shaft, an input gear affixed to said input shaft in position to mesh with said first gear, a conical stack of transmission gears affixed coaxially to said input shaft, a plurality of incremental output shafts journaled about said transmission gears, separate means to couple each of said incremental output shafts to any one of said transmission gears, rotation-integrating means disposed about said input shaft for adding the rotations of said incremental output shafts, a total output shaft coaxial with said input shaft and driven by said rotation-integrating means, and a gear affixed to said output shaft in position to mesh with said second gear.

2. Liquid dispensing apparatus comprising a housing, four sets of indicator drums disposed on parallel horizontal axes, said sets including two pairs of two sets each, the sets of each pair being disposed one above the other and the two pairs being disposed at opposite sides of said housing, the axes of said sets defining a space of substantially rectangular parallelepiped shape, liquid metering means exterior of said space, a first gear journaled in said housing and driven from said metering means, means coupling said gear to one set of drums of each of said pairs, a second gear journaled in said housing, means coupling said second gear to the other set of drums of each of said pairs, and variable drive means for interconnection of said first and second gears, said variable drive means comprising a frame removably affixable in said housing substantially entirely within said space, and input shaft journaled in said frame, an input gear affixed to said input shaft in position to mesh with said first gear upon affixation of said frame in said housing, a conical stack of transmission gears affixed coaxially to said input shaft, a plurality of incremental output shafts journaled in said frame about said transmission gears, separate means to couple each of said incremental output shafts to any one of said transmission gears, rotation-integrating means supported in said frame and disposed about said input shaft for adding the rotations of said incremental output shafts, a total output shaft coaxial with said input shaft and driven by said rotation-integrating means, and a gear affixed to said total output shaft in position to mesh with said second gear upon affixation of said frame in said housing.

3. Liquid dispensing apparatus comprising a housing, four sets of indicator drums disposed on parallel horizontal axes, said sets including two pairs of two sets each, the sets of each pair being disposed one above the other and the two pairs being disposed at opposite sides of said housing, the axes of said sets defining a space of substantially rectangular parallelepiped shape, liquid metering means below said space, a first gear journaled in said housing and driven from said metering means, means coupling said gear to the lower set of drums of each of said pairs, a second gear journaled in said housing above said first gear, means coupling said second gear to the upper set of drums of each of said pairs, and variable drive means for interconnection of said first and second gears, said variable drive means comprising a frame removably affixable in said housing substantially entirely within said space, an input shaft journaled in said frame, an input gear affixed to said input shaft in position to mesh with said first gear upon affixation of said frame in said housing, a conical stack of transmission gears affixed coaxially to said input shaft, a plurality of incremental output shafts journaled in said frame about said transmission gears, separate means to couple each of said incremental output shafts to any one of said transmission gears, rotation-integrating means supported in said frame and disposed about said input shaft for adding the rotations of said incremental output shafts, a total output shaft coaxial with said input shaft and driven by said rotation-integrating means, and a gear affixed to said total output shaft in position to mesh with said second gear upon affixation of said frame in said housing.

References Cited in the file of this patent

UNITED STATES PATENTS

| Re. 22,193 | Carroll | Oct. 6, 1942 |
|---|---|---|
| 1,890,211 | Zink | Jan. 10, 1933 |
| 2,117,750 | Svenson | May 17, 1938 |
| 2,311,031 | De Lancey | Feb. 16, 1943 |
| 2,375,602 | Wickham | May 8, 1945 |
| 2,414,842 | Trexler | Jan. 28, 1947 |
| 2,577,115 | Eichner | Dec. 4, 1951 |
| 2,898,002 | Blanchet et al. | Aug. 4, 1959 |

FOREIGN PATENTS

| 212,840 | Switzerland | Apr. 1, 1941 |